(12) United States Patent
Asakura et al.

(10) Patent No.: US 7,180,454 B2
(45) Date of Patent: Feb. 20, 2007

(54) REMOTE DOOR LOCK CONTROLLER FOR VEHICLES

(75) Inventors: Suguru Asakura, Utsunomiya (JP); Shinichi Arie, Saitama (JP); Kenichi Sawada, Utsunomiya (JP); Katsuyasu Yamane, Tochigi-ken (JP); Kentaro Yoshimura, Utsunomiya (JP); Masaaki Ochi, Hirakata (JP)

(73) Assignees: Honda Motor Co., Ltd., Tokyo (JP); Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/931,208

(22) Filed: Sep. 1, 2004

(65) Prior Publication Data

US 2005/0057408 A1   Mar. 17, 2005

(30) Foreign Application Priority Data

Sep. 2, 2003   (JP) .............................. 2003-310501

(51) Int. Cl.
*H01Q 1/32* (2006.01)
(52) U.S. Cl. ...................................... 343/713; 343/714
(58) Field of Classification Search ........ 343/711–714, 343/893
See application file for complete search history.

(56) References Cited

U.S. PATENT DOCUMENTS 5,929,769 A * 7/1999 Garnault .................... 340/5.61
6,087,987 A * 7/2000 Bachhuber et al. ......... 342/457
6,218,932 B1 * 4/2001 Stippler ................. 340/426.16
6,476,517 B1 * 11/2002 Okada ........................ 307/10.2
6,853,296 B2 * 2/2005 Chandebois ........... 340/426.28

FOREIGN PATENT DOCUMENTS

| DE | 196 35 003 A1 | 3/1998 |
| EP | 1 099 813 | 5/2001 |
| EP | 1 143 091 A | 10/2001 |
| FR | 2 807 238 A | 10/2001 |
| FR | 2 816 346 A | 5/2002 |
| JP | 60-159264 | 8/1985 |
| JP | 2002-046541 | 2/2002 |

OTHER PUBLICATIONS

Translation of pertinent portions of Chinese Office Action mailed Jan. 20, 2006.

* cited by examiner

*Primary Examiner*—Shih-Chao Chen
(74) *Attorney, Agent, or Firm*—Arent Fox LLP

(57) ABSTRACT

LF antennas are mounted respectively on the corners of a rear bumper of a vehicle. Radio waves radiated from the LF antennas mounted respectively on the corners of the rear bumper are propagated to the both surfaces of the vehicle on the opposite sides of the corner, providing effective transmission ranges. The remaining LF antennas are mounted respectively on the side surfaces of the vehicle such that their effective transmission ranges overlap the effective transmission ranges of the LF antennas mounted respectively on the corners of the rear bumper.

7 Claims, 16 Drawing Sheets

| STEP | DOOR SENSOR | | |
|---|---|---|---|
| | 20a | 20b | 20c |
| S1 | | | |
| S2 | 44 (54) | 48 (58) | 46 (56) |
| S4 | 46 (56) | 50 (60) | 50 (60) |

| STEP | DOOR SENSOR | | |
|---|---|---|---|
| | 20a | 20b | 20c |
| S11 | | | |
| S12 | 44, 46 (54), (56) | 48, 50 (58), (60) | 46, 50 (56), (60) |

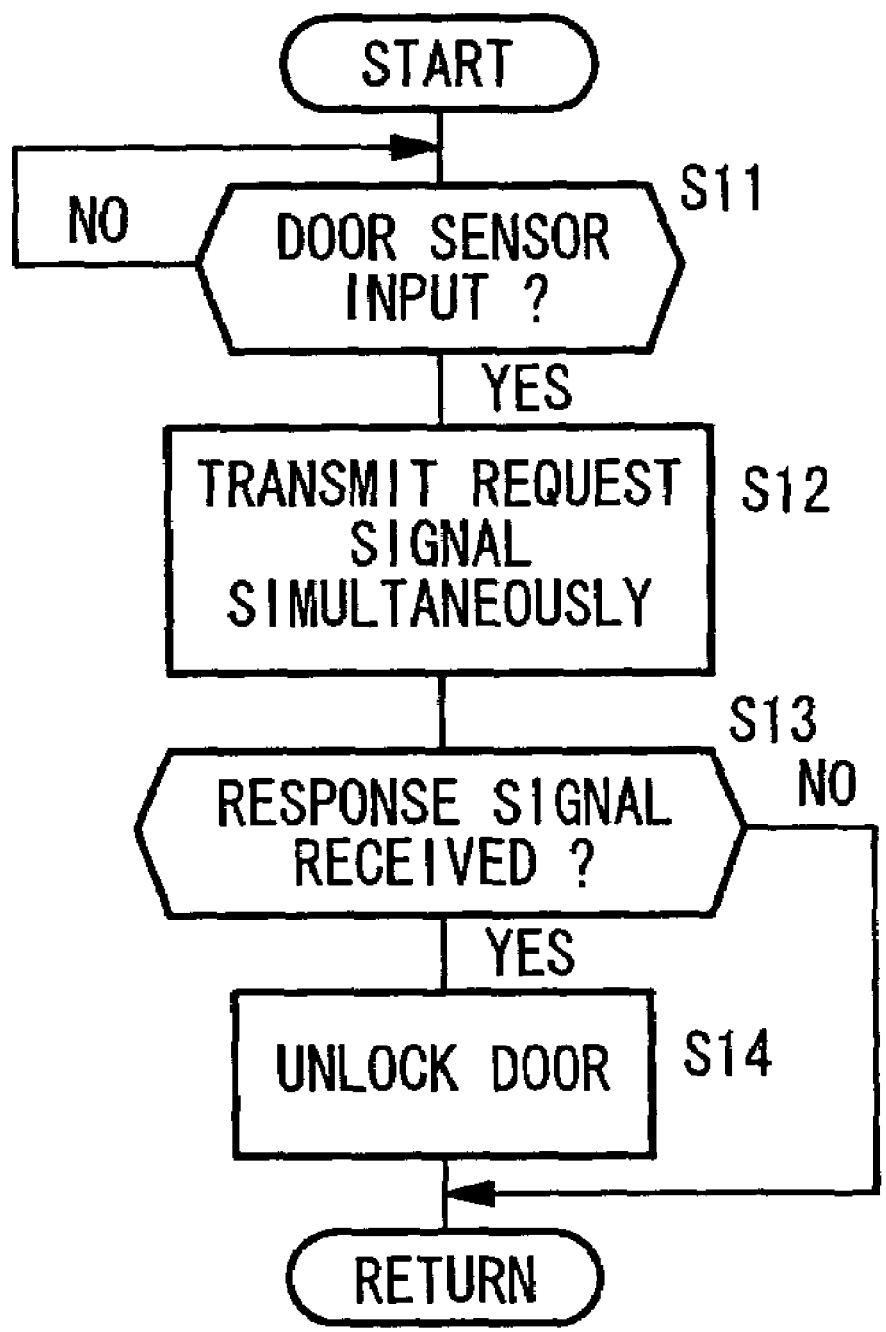

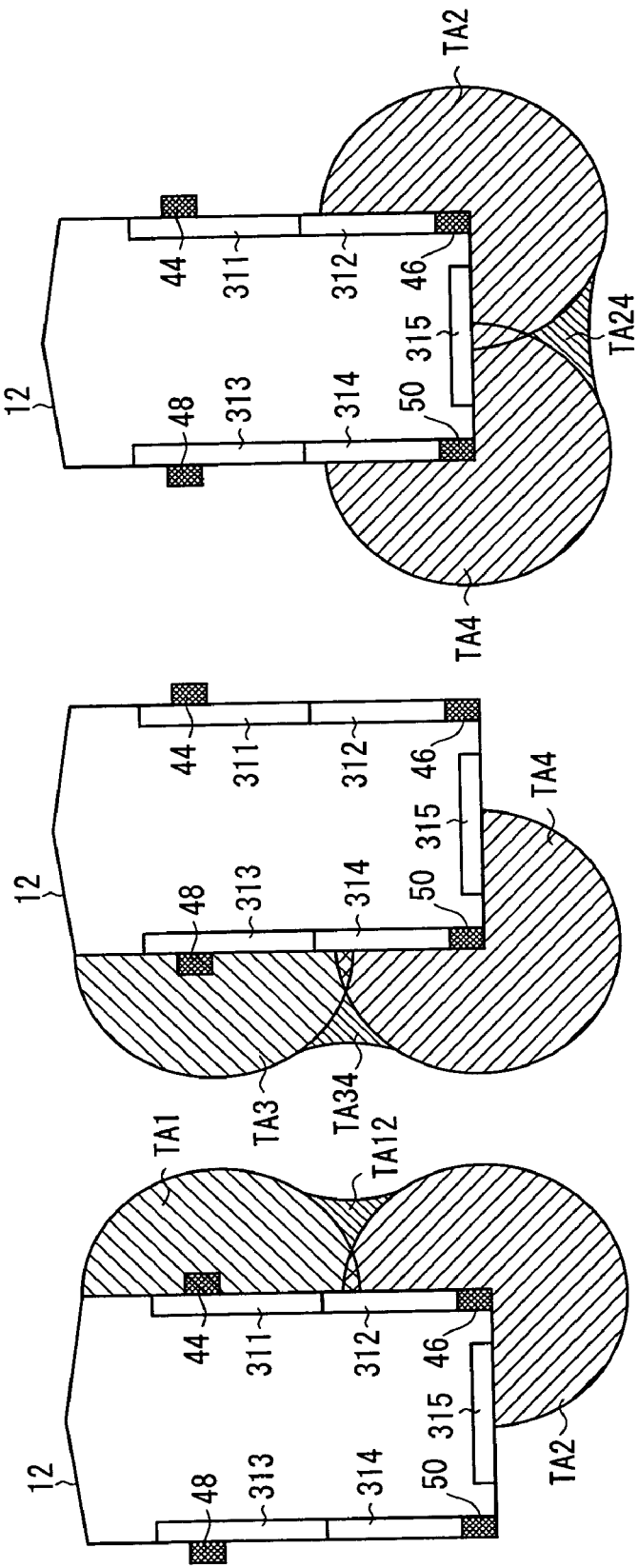

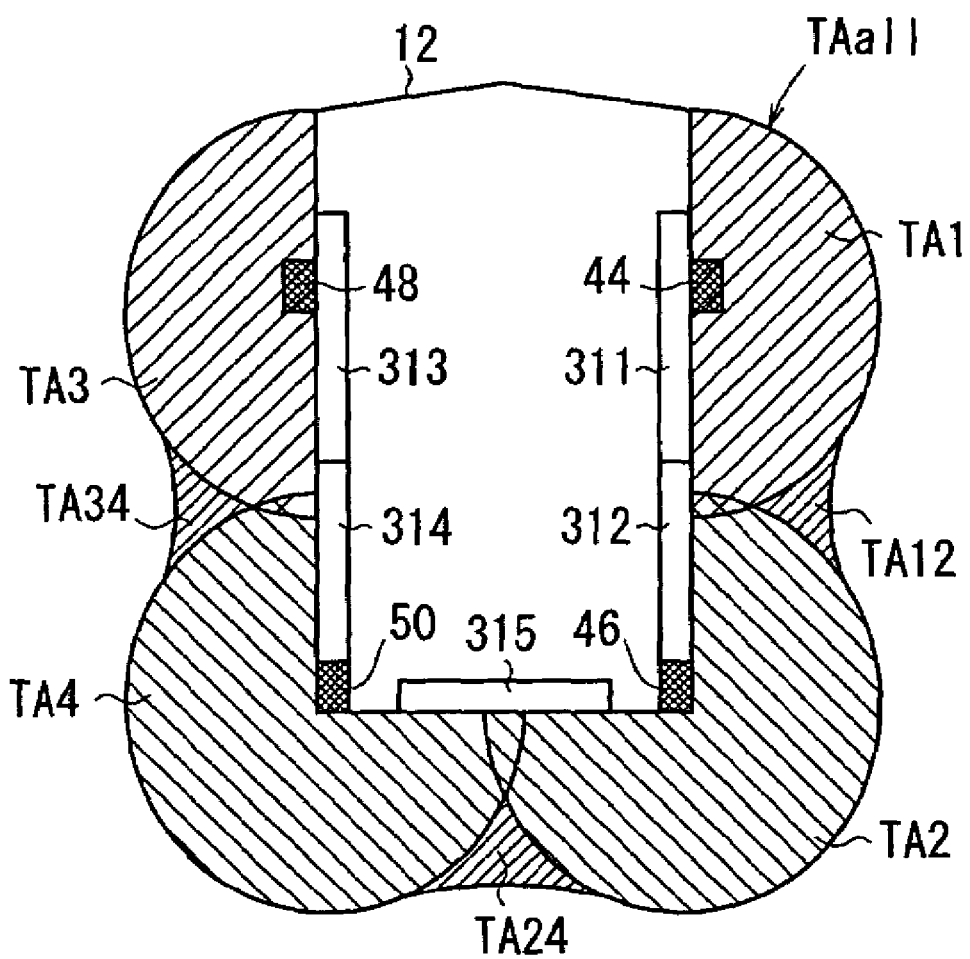

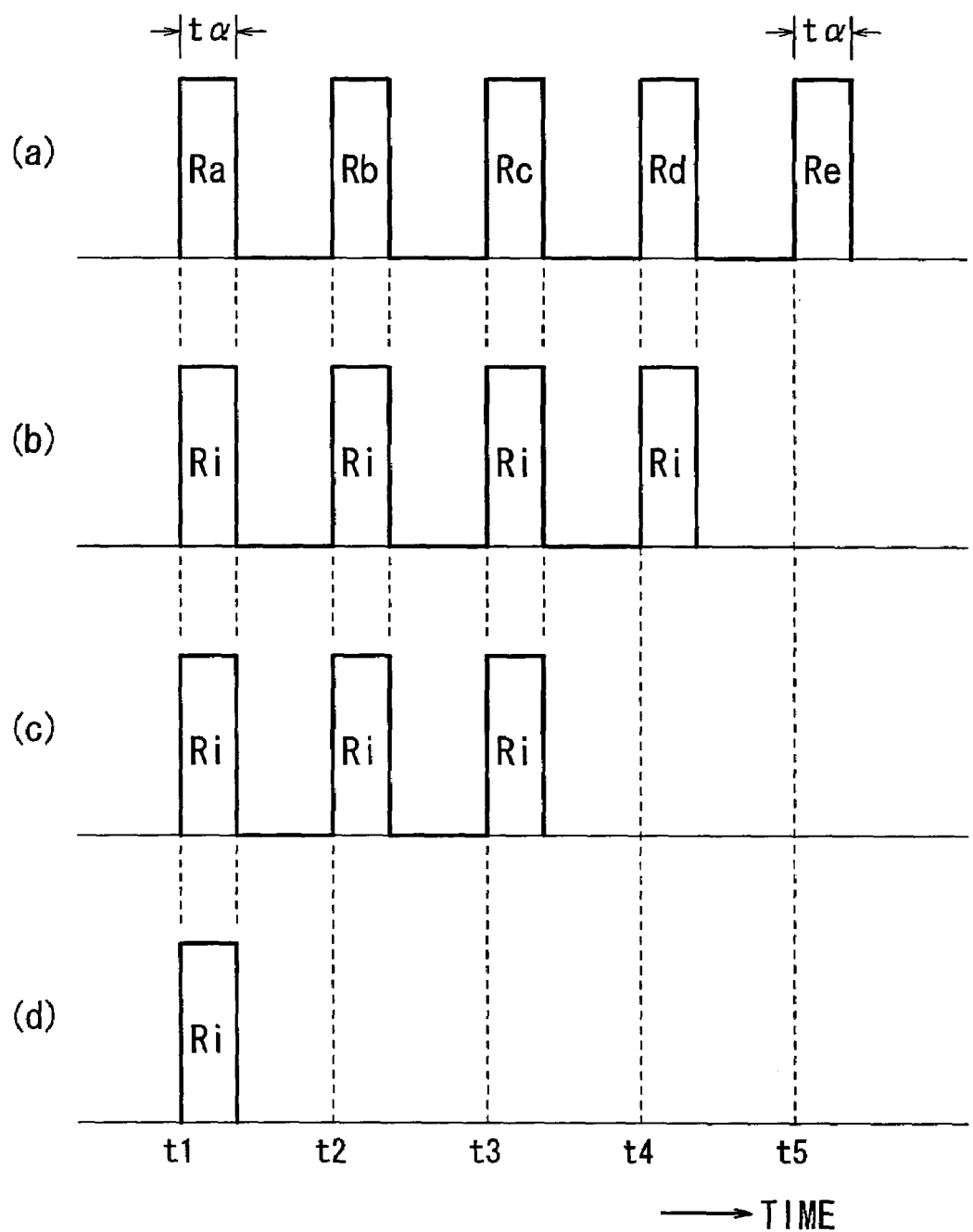

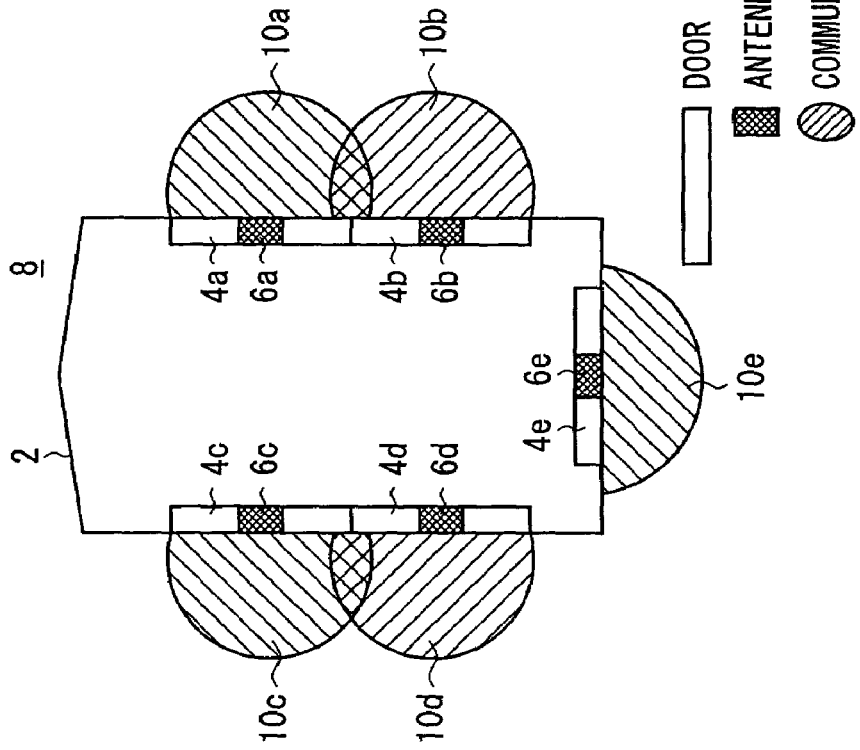
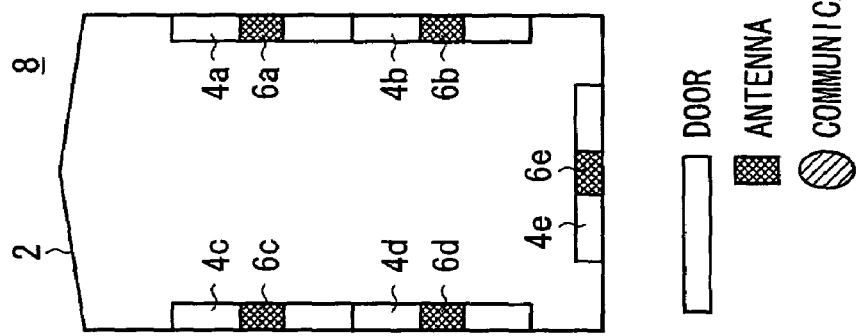

REMOTE DOOR LOCK CONTROLLER FOR VEHICLES

BACKGROUND OF THE INVENTION

1. Field of the Invention

The present invention relates to a vehicular remote door lock controller that is suitable for use in a smart entry system for unlocking the doors of a vehicle according to a bidirectional authentication process that is performed with a vehicle-mounted unit (vehicle-side controller) when the owner (user) of a portable unit touches an outer door handle, which functions as a touch sensor, of the vehicle, or a smart entry system for unlocking the doors of a vehicle free of touch sensors according to a bidirectional authentication process between a vehicle-mounted unit (vehicle-side controller) and a portable unit, that automatically starts when the owner of a portable unit approaches the vehicle.

2. Description of the Related Art

In recent years, there have been proposed various remote door lock controllers for locking and unlocking vehicle doors with a radio signal transmission/reception portable unit without inserting a key into a key cylinder, to be used as a substitute for or in combination with conventional vehicular door lock devices which lock and unlock vehicle doors by inserting a key into a key cylinder.

The proposed remote door lock controllers use radio signals in an LF (Low Frequency) range (30 through 300 [kHz]), e.g., radio signals having frequencies of 125 [kHz] or 134 [kHz], for mutual radio communications between the vehicle and the portable unit.

Radio signals in the above LF range cover distances, according to output level, that are shorter than distances by radio signals used by remote door lock controllers in VHF/UHF bands including a frequency of 300 [MHz]. Usually, antennas are installed on the vehicle near the doors thereof for sending radio signals in the above LF range.

FIGS. 15A and 15B of the accompanying drawings show a layout of vehicular LF antennas 6a through 6e installed on respective doors 4a through 4e of a vehicle 2 which incorporates a conventional vehicular remote door lock controller 8.

In FIGS. 15A and 15B, the doors 4a, 4c are doors near a driver seat and a front passenger seat, respectively, the doors 4b, 4d are doors near rear passenger seats, respectively, and the door 4e is a trunk door or a hatchback door.

In order for the vehicular remote door lock controller 8 to detect a portable unit which may be present in areas around the doors 4a through 4e of the vehicle 2, the antennas 6a through 6e send respective request signals Ra through Re successively at times t1 through t5 for respective constant periods tα, as indicated by a timing chart shown in FIG. 16 of the accompanying drawings.

FIG. 15B shows effective transmission ranges (communication ranges) 10a through 10e of the respective antennas 6a through 6e for the request signals Ra through Re.

If a portable unit is present in either one of the effective transmission ranges 10a through 10e of the respective antennas 6a through 6e, then the portable unit which has received one of the request signals Ra through Re sends a response signal to a control unit of the vehicle 2. In response to the response signal, the control unit locks and unlocks the doors 4a through 4e.

The vehicular remote door lock controller 8 shown in FIGS. 15A and 15B which locks and unlocks the doors without inserting a key into a key cylinder is disadvantageous in that since the antennas 6a through 6e need to be installed in the vicinity of the doors 4a through 4e, respectively, the number of antennas used is large, making the vehicular remote door lock controller 8 costly and heavy.

Furthermore, inasmuch as the five antennas 6a through 6e successively transmit request signals, it takes time to detect a portable unit that may be positioned in the effective transmission ranges.

Conventional arrangements as to a layout of antennas and a process of sending signals from antennas are disclosed in Japanese Laid-Open Patent Publications Nos. 60-159264 and 2002-46541.

Specifically, Japanese Laid-Open Patent Publication No. 60-159264 shows a pair of loop antennas mounted on a rear portion of a vehicle, e.g., rear combination lamps, rear finishers, a rear bumper, or a rear window glass pane. The loop antennas simultaneously transmit request signals to detect a portable unit for locking and unlocking the trunk door of the vehicle.

Japanese Laid-Open Patent Publication No. 2002-46541 reveals a technique having antennas disposed centrally on front and rear seats, respectively, in the passenger compartment of a vehicle for simultaneously transmitting signals to detect a portable unit while reducing a non-communication range within the passenger compartment based on an overlap of radio waves, and also a technique having four antennas disposed respectively on front and rear portions of the left and right sides of a vehicle for simultaneously transmitting signals to provide a constriction-free communication range outside of the passenger compartment to detect a portable unit.

The arrangement disclosed in Japanese Laid-Open Patent Publication No. 60-159264 resides in that since the directivity of the antenna of the portable unit is unidirectional, the loop antennas simultaneously transmit radio signals that are out of phase with each other by 90°. Therefore, regardless of which direction the directivity of the antenna of the portable unit is oriented in, the portable unit can be detected to lock and unlock the trunk door of the vehicle. However, the number of antennas used on the vehicle is increased rather than reduced, and the publication discloses nothing about efforts to reduce the number of antennas used on the vehicle.

The techniques disclosed in Japanese Laid-Open Patent Publication No. 2002-46541 for simultaneously energizing the antennas on the front and rear portions of the vehicle to provide a constriction-free communication range outside of the passenger compartment are illustrated in the drawings. However, nothing is disclosed in the publication about efforts to reduce the number of antennas used on the vehicle.

SUMMARY OF THE INVENTION

It is an object of the present invention to provide a vehicular remote door lock controller which is capable of efficiently detecting a portable unit that is positioned near a vehicle with a reduced number of antennas installed on the vehicle.

Another object of the present invention is to provide a vehicular remote door lock controller which is capable of detecting a portable unit in a short period of time.

According to the present invention, there is provided a vehicular remote door lock controller comprising a portable unit, a control unit mounted on a vehicle for performing radio communications with the portable unit through radio waves, and locking and unlocking doors of the vehicle depending on results of the radio communications, and at least three antennas mounted on the vehicle for performing radio communications with the portable unit which is present around the vehicle, at least one of the three antennas being mounted on a corner of the vehicle and the remaining antennas being disposed such that communication ranges thereof overlap a communication range of the antenna mounted on the corner of the vehicle, and the communication ranges of the remaining antennas do not overlap each other outside of the vehicle.

Since at least one of the antennas is mounted on a corner of the vehicle, the radio wave radiated from the antenna on the corner is propagated to both surfaces of the vehicle on both sides of the corner, providing a communication range. Inasmuch as the remaining antennas are disposed such that their communication ranges overlap the communication range of the antenna on the corner, the control unit can reliably communicate with the portable unit which is positioned near the surfaces of the vehicle on both sides of the corner, using the three antennas. As a result, the number of antennas is reduced, and the portable unit can be detected in a shorter period of time as the number of antennas is reduced.

Specifically, the remaining antennas are disposed respectively on surfaces of the vehicle on both sides of the corner of the vehicle on which the at least one antenna is mounted. For example, if one of the antennas is mounted on the corner of the vehicle, then the remaining antennas may be disposed respectively on side and rear surfaces of the vehicle on both sides of the corner. One or two of the remaining antennas may be mounted on the other rear corner of the vehicle.

The vehicle may have door locks mounted in various doors thereof, e.g., side doors thereof, a rear hatchback door (tail gate) thereof, and a rear trunk door thereof.

The antenna mounted on the corner and at least one of the remaining antennas simultaneously transmit signals to produce an increased field intensity in the vicinity of an area where the communication ranges of the antennas overlap each other. Thus, the communication ranges can be widened with a reduced number of antennas.

According to the present invention, the vehicular remote door lock controller for locking and unlocking the doors of the vehicle using the portable unit is capable of detecting the portable unit that may be positioned near the vehicle with a reduced number of antennas. The vehicular remote door lock controller can detect the portable unit efficiently in a short period of time by transmitting signals simultaneously from the antennas.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 10 is a flowchart of the simultaneous transmission control process for request signals;

FIG. 11A is a diagram showing an increased effective transmission range produced when signals are simultaneously transmitted from LF antennas that are positioned near a driver seat and at a rear corner behind the driver seat;

FIG. 11B is a diagram showing an increased effective transmission range produced when signals are simultaneously transmitted from LF antennas that are positioned near a front passenger seat and at a rear corner behind the front passenger seat;

FIG. 11C is a diagram showing an increased effective transmission range produced when signals are simultaneously transmitted from the LF antennas that are positioned at the respective rear corners;

FIG. 13 is a diagram showing effective transmission ranges for request signals that are intermittently simultaneously transmitted from all the LF antennas;

FIG. 14 is a diagram showing a comparison between a total communication time of a conventional vehicular remote door lock controller and a total communication time of the vehicular remote door lock controller according to the present invention;

FIG. 15A is a diagram showing a layout of conventional LF antennas;

FIG. 15B is a diagram showing communication ranges (effective transmission ranges) of the conventional LF antennas.

DESCRIPTION OF THE PREFERRED EMBODIMENTS

Figure 1:
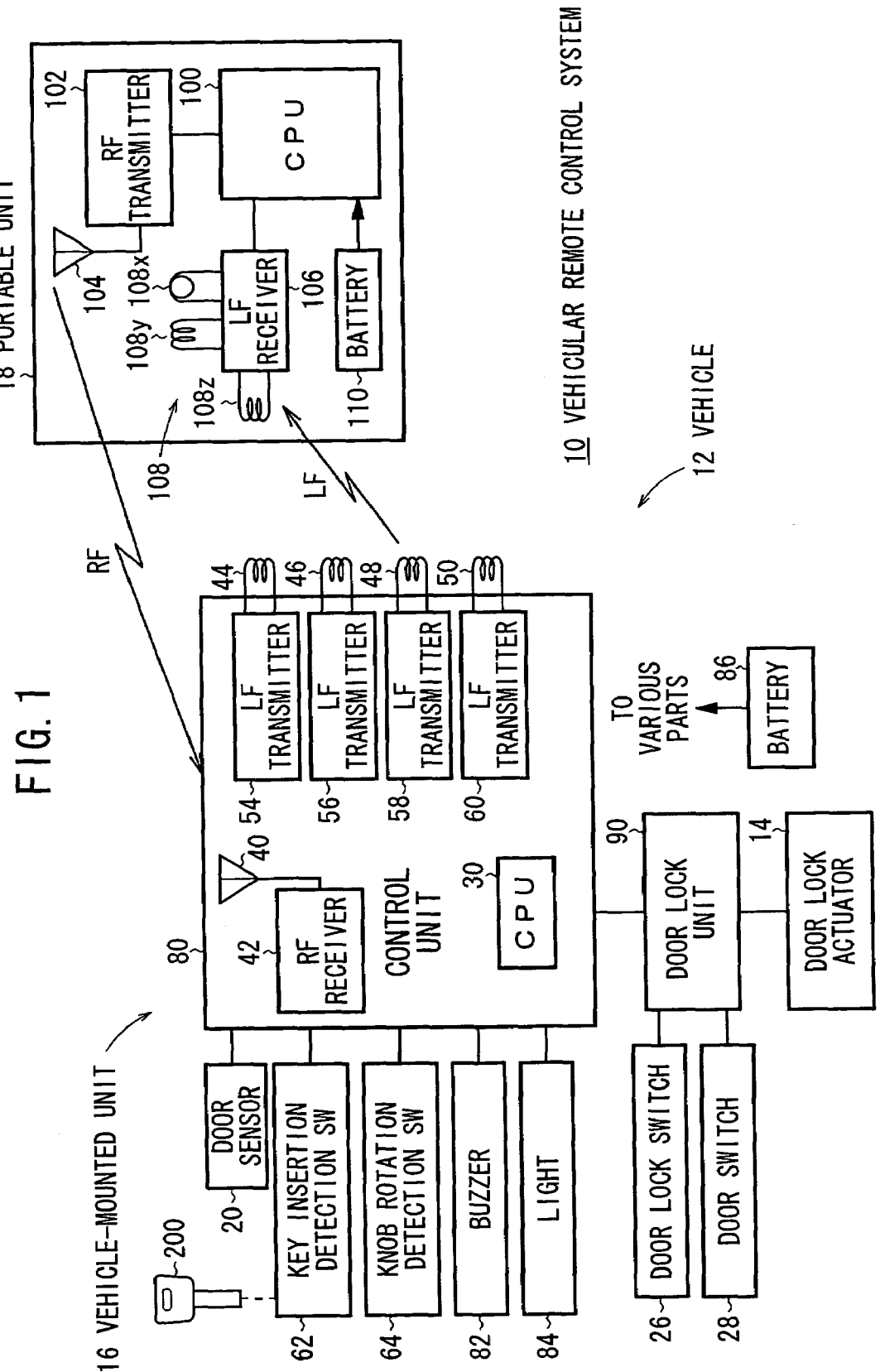
FIG. 1 is a block diagram of a vehicular remote control system to which a vehicular remote door lock controller according to the present invention is applied.

FIG. 1 shows in block form a vehicular remote control system 10 to which a vehicular remote door lock controller according to an embodiment of the present invention is applied.

Figure 2:
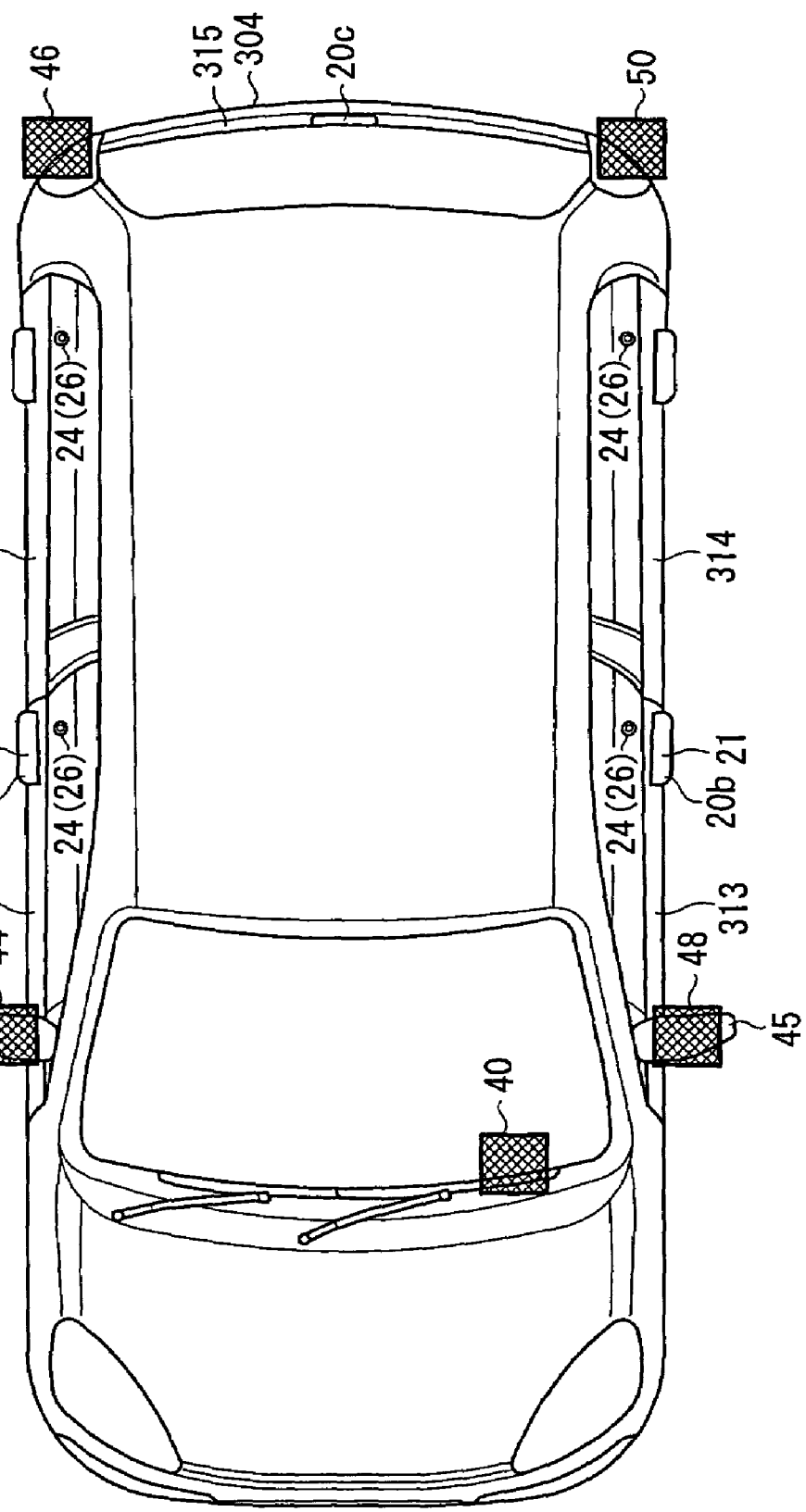
FIG. 2 is a plan view of a vehicle incorporating the vehicular remote control system shown in FIG. 1.

FIG. 2 shows in plan a vehicle 12 incorporating the vehicular remote control system 10.

As shown in FIGS. 1 and 2, the vehicular remote control system 10 basically comprises a vehicle-mounted unit 16 including a control unit 80 as a controller mounted on a vehicle 12, and a portable unit 18 for instructing the vehicle-mounted unit 16 to lock and unlock the doors of the vehicle 12 with a radio signal. The portable unit 18 is applicable to both a smart entry system and a keyless entry system.

The portable unit 18 has a CPU (Central Processing Unit) 100 as a controller. To the CPU 100, there are connected an RF antenna 104 for transmitting an RF (Radio Frequency) signal having a frequency of 315 [MHz] through an RF transmitter 102, and an LF antenna 108 for receiving an LF (Low Frequency) signal having a frequency of 125 [kHz] through an LF receiver 106. The portable unit 18 has a replaceable battery 110 such as a button cell or the like which supplies electric power to the CPU 100 which, in turn, supplies electric power to the RF transmitter 102 and the LF receiver 106.

The LF antenna 108 comprises three LF antennas 108x, 108y, 108z having respective axes extending parallel to the respective three orthogonal axes X, Y, Z. Therefore, the portable unit 18 has radio-wave (electromagnetic-wave) directivity along the three orthogonal axes X, Y, Z for receiving LF signals on radio waves coming from any directions with high sensitivity. Stated otherwise, the portable unit 18 can receive radio waves with high sensitivity regardless of the spatial position and direction in which it is carried by the owner. The portable unit 18 is of a size equal to or smaller than a credit card with a built-in IC (Integrated Circuit) chip, for example.

LF signals as request signals for requesting transmission (transmission request signals) are sent from the vehicle-mounted unit 16 to the portable unit 18. The CPU 100 of the portable unit 18 is usually in a sleep mode. When an LF signal from the vehicle-mounted unit 16 is received by the LF antenna 108 and the LF receiver 106, the CPU 100 of the portable unit 18 wakes up, i.e., is activated, from the sleep mode. In this manner, the portable unit 18 saves power.

Figure 3:
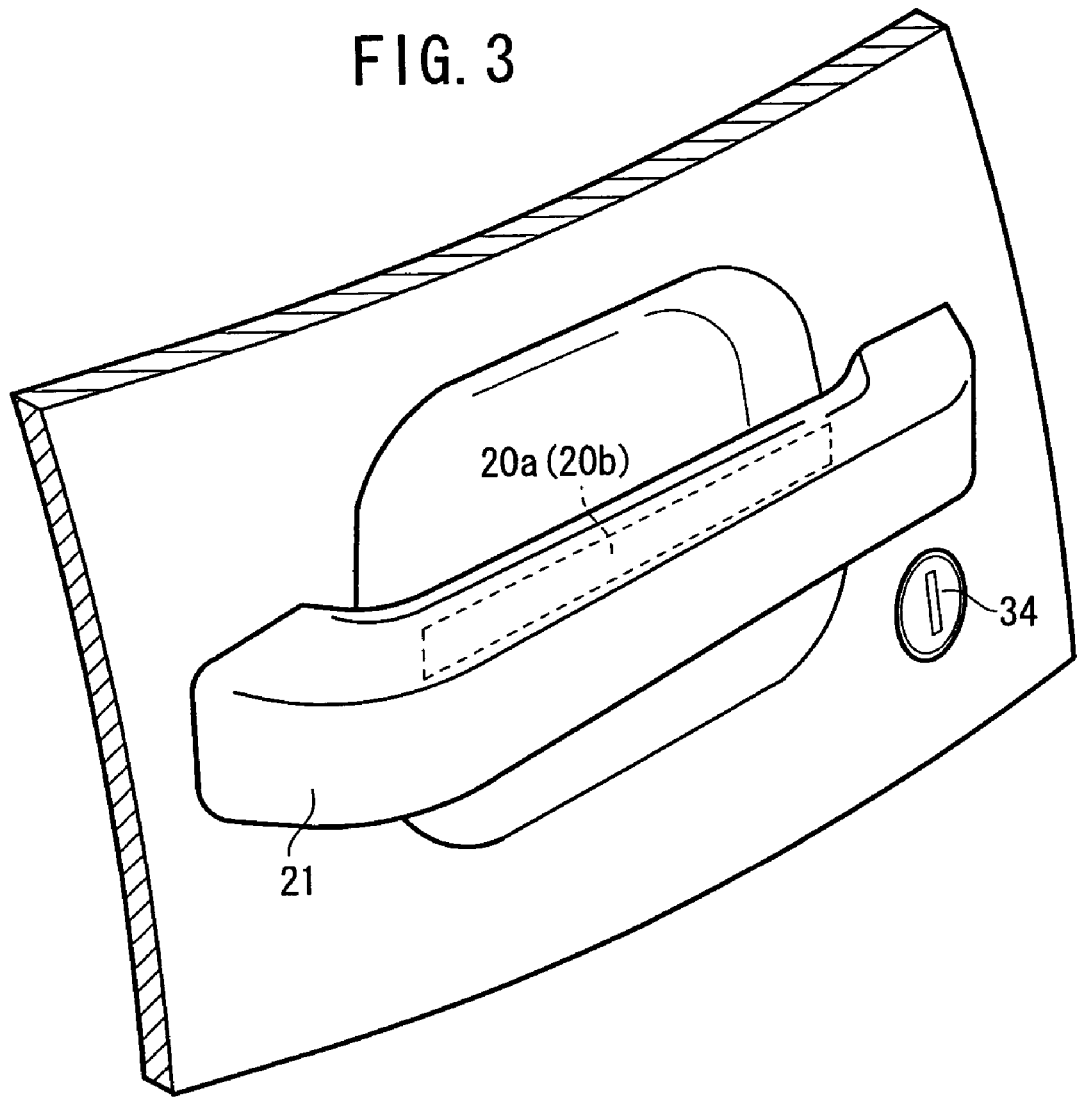
FIG. 3 is a fragmentary perspective view of a vehicle door near the driver seat of the vehicle in the vicinity of an outer door handle.

The vehicle 12 has a door 311 near the driver seat and a door 313 near the front passenger seat, the doors 311, 313 having respective outer door handles 21 (see also FIG. 3). Door sensors 20a, 20b, which operate when these doors 311, 313 are unlocked, are mounted on the respective outer door handles 21 for use in the smart entry system. The vehicle 12 also has a rear hatchback door (trunk door) 315, and a door sensor 20c, which operates when the rear hatchback door 315 is unlocked, mounted on the door handle of the rear hatchback door 315.

The door sensors 20a, 20b, 20c are on the surfaces of the respective door handles which face the vehicle body, i.e., the inner surfaces of the respective door handles. Each of the door sensors 20a, 20b, 20c comprises a variable-electro-static-capacitance touch sensor. The door sensors 20a, 20b, 20c are usually turned off, and are turned on when a finger of the user acts on the door handle, i.e., touches the inner surface of the door handle.

Figure 4:
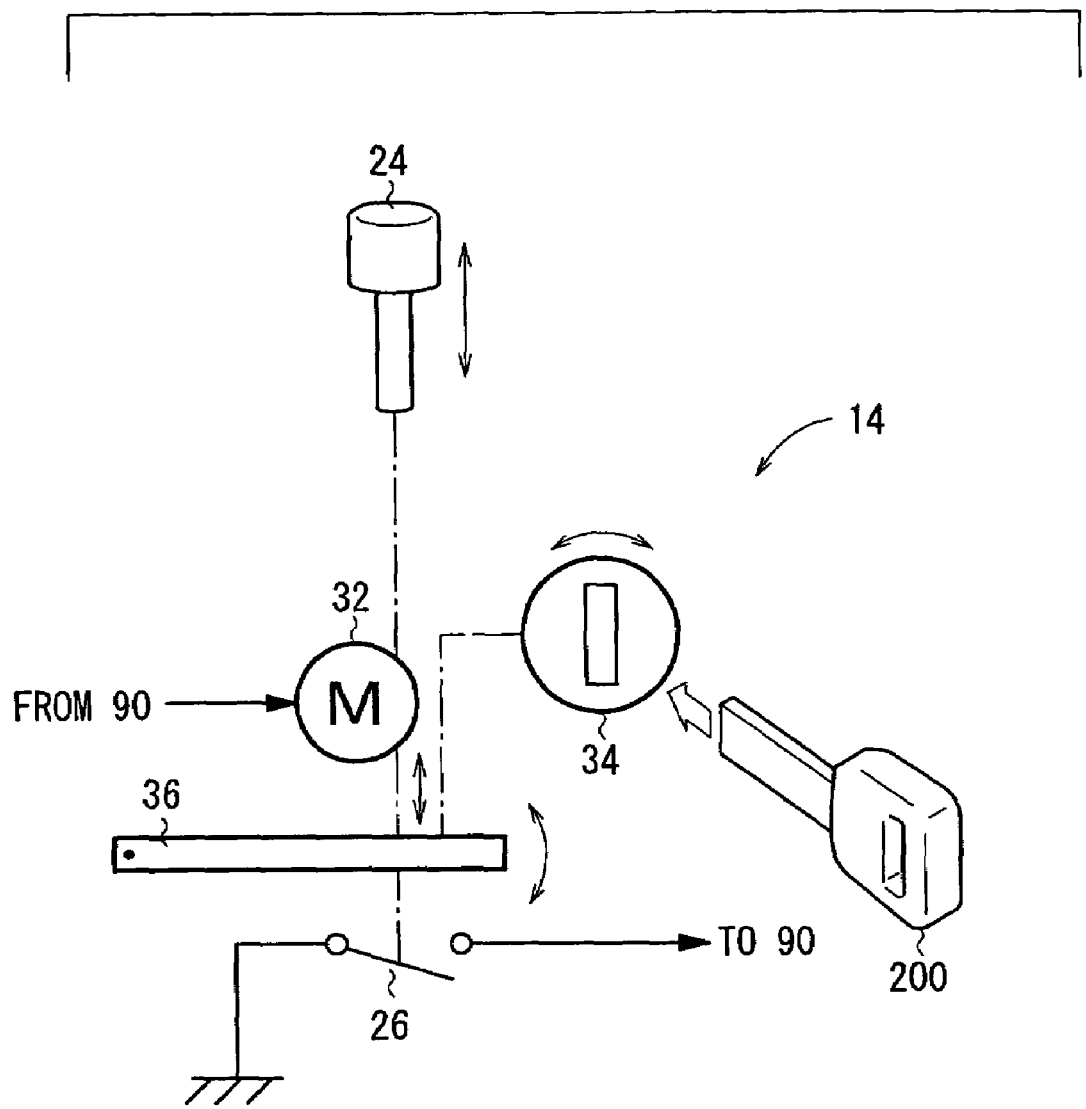
FIG. 4 is a schematic view of a door lock actuator for locking a door.

As shown in FIG. 4, each of the doors 311 through 314 has, in its door lining, a door lock switch 26 (see FIG. 2) which is turned off to lock the door when a door lock knob 24 is depressed manually, and turned on to unlock the door when the door lock knob 24 is lifted manually, and a door switch 28 (see FIG. 1) for detecting whether the door is open or closed. The door lock switch 26 is turned off when the door is locked and turned on when the door is unlocked. The door switch 28 is turned on when the door is open and turned off when the door is closed.

As shown in FIG. 4, the door can be locked and unlocked when a locking lever 36 turned a predetermined angle by vertical movement of the door lock knob 24, rotation of a door lock motor 32 electrically energized by a door lock unit 90, or manual rotation of a key cylinder 34 with an immobilizer key 200 inserted therein. The door lock knob 24, the lock motor 32, and the key cylinder 34 are operatively connected to the locking lever 36 by a cam/gear/link mechanism.

The door lock actuator 14 for locking and unlocking the door is basically made up of the door lock motor 32, the cam/gear/link mechanism, and the locking lever 36.

On ordinary vehicles, the cam/gear/link mechanism allows the door lock knob 24 to move vertically when the key cylinder 34 is rotated and when the door lock motor 32 is energized. However, in the present embodiment, the key cylinder 34 is not rotated and the door lock motor 32 is not energized even when the door lock knob 24 moves vertically, and the key cylinder 34 is not rotated even when the door lock motor 32 is energized.

The immobilizer key 200 comprises an ordinary mechanical key incorporating a transponder in its grip. For starting the engine of the vehicle 12, for example, the immobilizer key 200 can be inserted into a knob slot (not shown) defined in a knob-type ignition assembly that is installed in the vehicle 12 near the steering wheel. With the immobilizer key 200 inserted in the knob slot, after bidirectional authentication communications between the immobilizer key 200 and an immobilizer unit (not shown) are successful, the engine is started when a knob (hereinafter referred to as "ignition knob") is turned from an ignition-on position to a start position. Even if the immobilizer key 200 is not inserted in the knob slot, after bidirectional authentication communications between the portable unit 18 and the control unit 80 are successful, the engine is started when the ignition knob is turned from the ignition-on position to the start position. As with the known ignition cylinder, the ignition knob can be turned successively through an off position, an ACC (accessory) position, an ignition-off position, and the start position.

To the control unit 80, there are connected a key insertion detection switch 62 for detecting when the immobilizer key 200 is inserted in the knob slot and outputting a signal indicative of the detected insertion of the immobilizer key 200 in the knob slot, and a knob rotation detection switch 64 for detecting when the ignition knob is rotated and outputting a signal indicative of the detected rotation of the ignition knob.

The vehicle 12 also has an RF unit including an RF antenna 40 and an RF receiver 42, the RF unit being disposed below the surface of the instrumental panel of the vehicle 12. LF antennas (extravehicular LF antennas) 44, 48 for extravehicular communications are mounted respectively on door mirrors 43, 45 disposed respectively near the driver seat and the front passenger seat. LF antennas (extravehicular LF antennas) 46, 50 for extravehicular communications are mounted respectively on both corners of the rear end of the vehicle 12.

Figure 5:
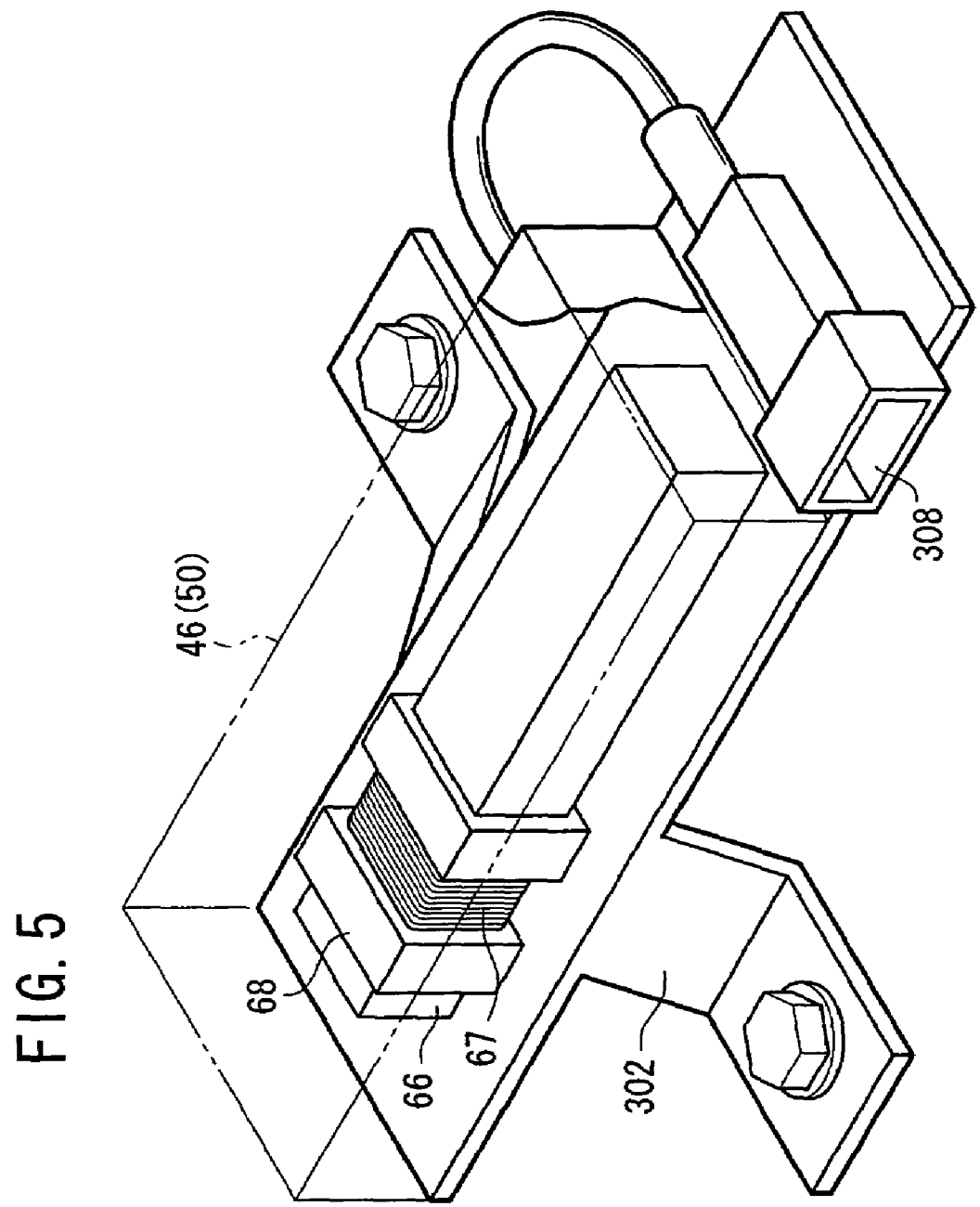
FIG. 5 is a perspective view of a mount structure of an LF antenna.
Figure 6:
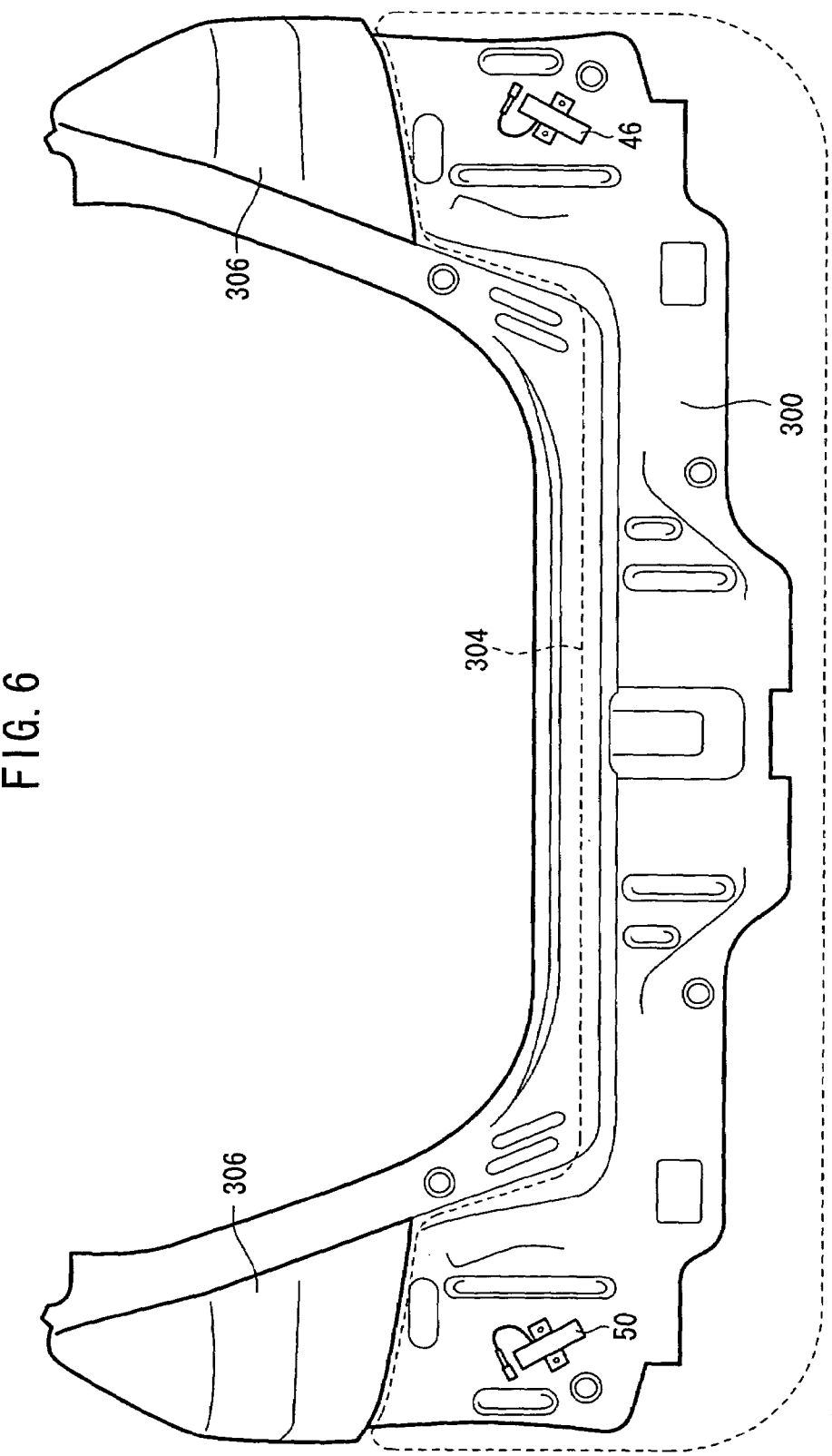
FIG. 6 is a view showing LF antennas mounted on the rear panel of the vehicle.

FIG. 5 shows in perspective each of the LF antennas 46, 50 mounted on a mount plate 302, and FIG. 6 shows each of the LF antennas 46, 50 installed on a rear panel 300 of the vehicle 12.

Each of the LF antennas 46, 50 is mounted on an upper portion (top portion) of the mount plate 302, which is made of a nonmagnetic material such as synthetic resin or the like and has a raised shape projecting outwardly of the vehicle 12. The LF antennas 46, 50 thus mounted on the mount plates 302 are installed on the respective corners of the rear panel 300, and are electrically connected to the control unit 80 by connectors 308. A rear bumper 304 is mounted on the rear panel 300 covering the LF antennas 46, 50, and rear combination lamps 306 are mounted on upper portions of the rear bumper 304.

As a result, in the present embodiment, the LF antennas 46, 50 are mounted on the rear corners of the vehicle 12, i.e., the opposite ends (corners) of the rear bumper 304.

Since the LF antennas 46, 50 are mounted on the upper portions of the raised mount plates 302, the LF antennas 46, 50 are floating, i.e., spaced, from the rear panel 300, which comprises an outer panel (steel panel), serving as a radio wave shield member, of the vehicle 12. Therefore, radio waves radiated from the LF antennas 46, 50 are easily propagated to the rear and side surfaces of the vehicle 12. The LF antennas 46, 50, provided on the left and right sides of the rear panel 300, have their axes (directivity orientations) inclined about 30° from the vertical direction in FIG. 6.

The rear bumper 304 and the door mirrors 43, 45 themselves are made of a radio-wave transmissive material such as synthetic resin or the like.

As schematically shown in FIG. 5, each of the LF antennas 44, 46, 48, 50 and the LF antennas 108$x$, 108$y$, 108$z$ of the portable unit 18 comprises a cylindrical or prismatic shaft 66 of a magnetic material such as ferrite or the like, and a bobbin 68 disposed around the shaft 66 and supporting a coil 67 of insulated electric wire wound on the bobbin 68. Actually, the LF antennas 44, 46, 48, 50, 108$x$, 108$y$, 108$z$ are encased, together with resonant capacitors (not shown), in molded synthetic resin for being securely fixed to the mount plates 302.

The control unit 80 also has LF transmitters 54, 56, 58, 60 that are connected respectively to the LF antennas 44, 46, 48, 50. Transmission request signals as LF signals from the LF transmitters 54, 56, 58, 60 are transmitted outside of the vehicle 12 through the respective LF antennas 44, 46, 48, 50. The transmission request signals thus sent are received by the LF receiver 106 of the portable unit 18 through the LF antenna 108 when the portable unit 18 is positioned in either one of effective transmission ranges TA1, TA2, TA3, TA4 (see FIG. 7), outside of the vehicle 12, of the respective LF antennas 44, 46, 48, 50. In this manner, request signals from the vehicle-mounted unit 16 for requesting the portable unit 18 to transmit an identification signal are sent and received.

Figure 7:
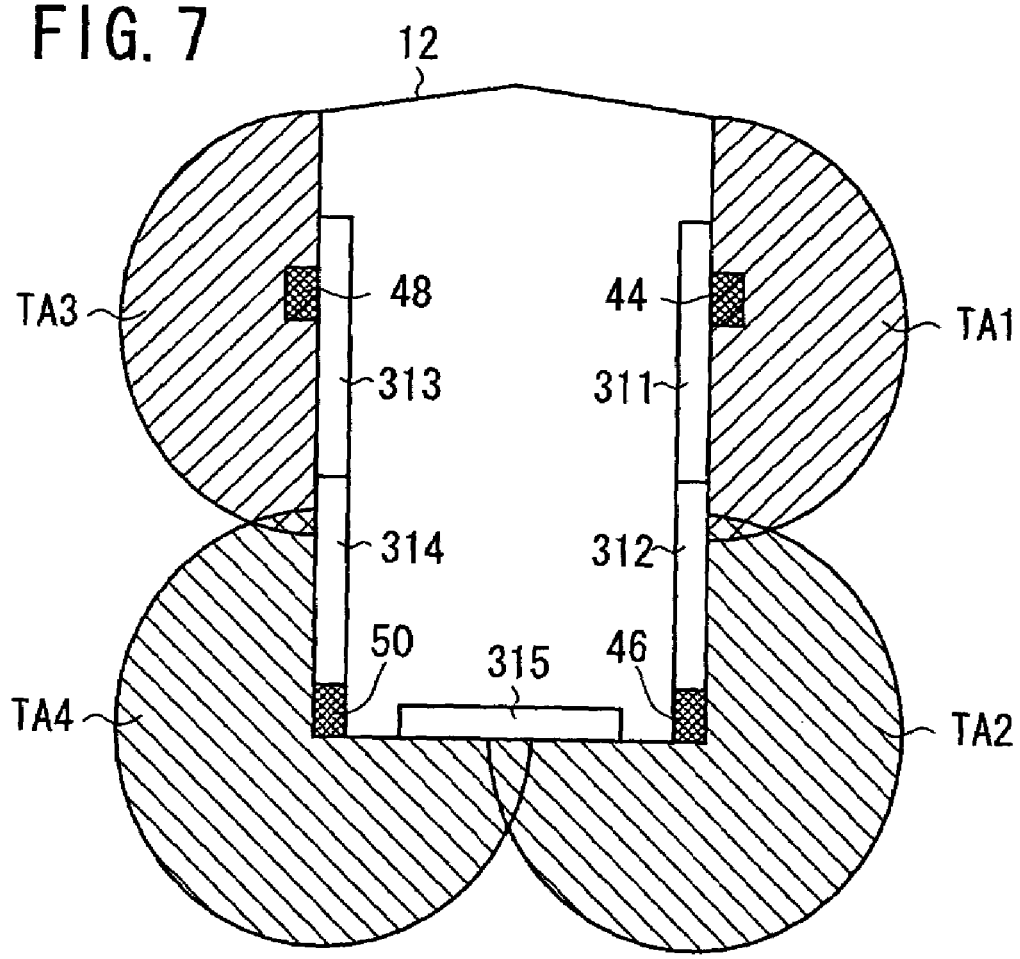
FIG. 7 is a diagram showing effective transmission ranges for request signals that are individually transmitted.

FIG. 7 shows the effective transmission ranges TA1, TA2, TA3, TA4 that serve as individual communication ranges for the request signals which are individually sent from the LF antennas 44, 46, 48, 50 to request the portable unit 18 to transmit an identification signal.

The effective transmission ranges TA1, TA3 belong to the LF antennas 44, 48 mounted on the respective door mirrors 43, 45, and provide ranges having a radius of about 1 [m] which cover areas extending from the front ends of the side surfaces of the vehicle 12 to the front doors 311, 313 and including the front doors 311, 313. The effective transmission ranges TA2, TA4 belong to the LF antennas 46, 50 mounted on the respective corners of the rear bumper 304, and provide ranges having a radius of about 1 [m] which cover areas extending from the rear ends of the front doors 311, 313 to the rear door 315 (rear surface) slightly beyond its central position.

The effective transmission ranges TA1, TA2, TA3, TA4 are ranges in which the portable unit 18 can receive the request signals that are individually sent from the LF antennas 44, 46, 48, 50.

The RF antenna 104 of the portable unit 18 has an effective transmission range for the RF signal which has a radius of about 5 [m] around the RF antenna 104. Stated otherwise, the RF signal can be received by the RF antenna 40 in an effective reception range which has a radius of about 5 [m] around the RF antenna 40. The effective reception range is therefore sufficiently greater than the effective transmission ranges TA1, TA2, TA3, TA4.

The vehicle-mounted unit 16 also includes, in addition to the control unit 80 (CPU 30) which controls the entire vehicular remote control system 10, the door lock unit 90 which operates in cooperation with the control unit 80. The control unit 80 and the door lock unit 90 may be integrally combined with each other.

The control unit 80 includes therein the RF receiver 42 and the LF receivers 54, 56, 58, 60. The door sensors 20$a$, 20$b$, 20$c$, a buzzer 82, and a hazard light 84 are connected to the control unit 80. For indicating that the doors are properly locked, the buzzer 82 is energized to produce a single blip. For outputting an alarm signal, the buzzer 82 is energized to produce a succession of six blips. When the doors are automatically locked, the buzzer 82 is energized to produce a blip and the hazard light 84 is energized to flicker, thus providing answerback.

The door switches 28 of the respective doors, the door lock switches 26 of the respective doors, and the door lock actuators 14 of the respective doors are connected to the door lock unit 90. The door lock actuators 14 lock and unlock the respective doors 311 through 315 with door lock assemblies (not shown).

The components of the vehicle-mounted unit 16 are supplied with electric power from a vehicle-mounted battery 86.

Each of the CPU (one-chip CPU) 30, the CPU (one-chip CPU) 100, and the door lock unit 90 comprises a CPU (Central Processing Unit), a ROM (Read-Only Memory), a RAM (Random-Access Memory), a clock generator, a counter, and a timer. The CPU automatically performs a sequence of calculations and data processing operations according to programs and data that are stored in the ROM.

For an easier understanding of the present invention, the vehicle-mounted unit 16 is controlled by the CPU 30 including the door lock unit 90, and the portable unit 18 is controlled by the CPU 100.

The vehicular remote control system 10 to which the vehicular remote door lock controller according to the embodiment of the present invention is applied is basically constructed and operates as described above. A process of unlocking the doors, which is performed by the vehicular remote control system 10, will be described below.

Figure 8:
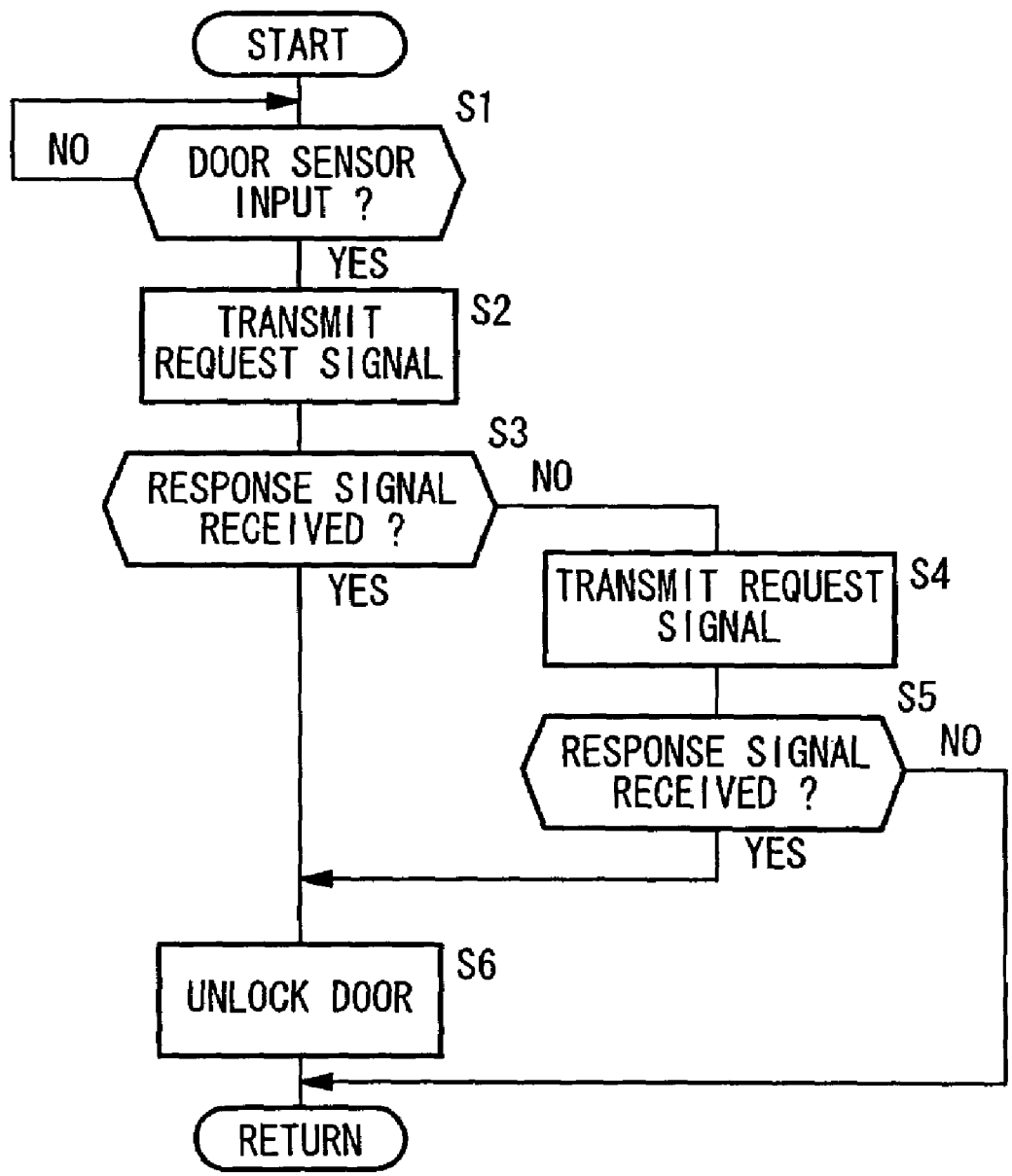
FIG. 8 is a flowchart of an individual transmission control process for request signals.

FIG. 8 is a flowchart of an individual transmission control process for request signals which is performed by the CPU 30 of the vehicle-mounted unit 16.

Figures 9A, 9B, 9C:
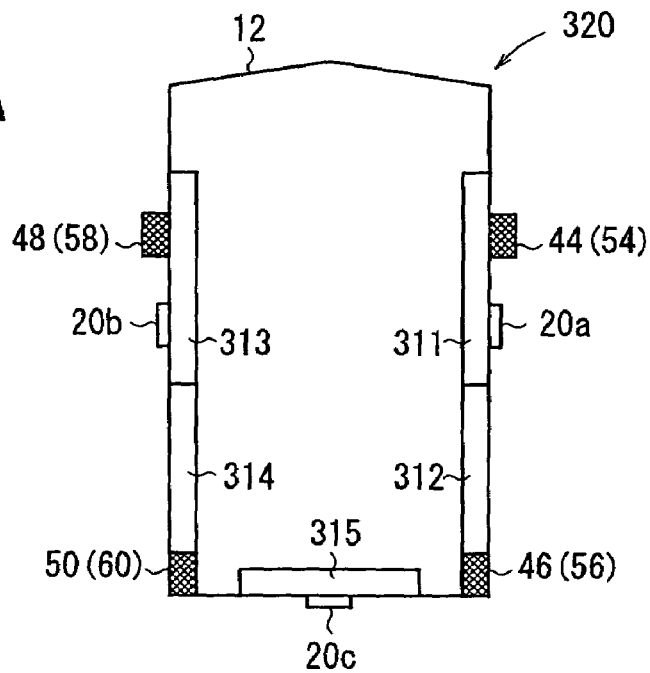
FIG. 9A is a diagram showing a door sensor/LF antenna table stored as data in the CPU of a vehicle-mounted unit and indicating a schematic layout of door sensors and LF antennas.
FIG. 9B is a diagram showing a request signal individual transmission control table to be referred to in the individual transmission control process for request signals.
FIG. 9C is a diagram showing a request signal simultaneous transmission control table to be referred to in a simultaneous transmission control process for request signals.

FIGS. 9A through 9C show data stored in the CPU 30 of the vehicle-mounted unit 16. FIG. 9A is a diagram showing a door sensor/LF antenna table 320 stored as data in the CPU 30 of the vehicle-mounted unit 16 and indicating a schematic layout of the door sensors and the LF antennas. FIG. 9B is a diagram showing a request signal individual transmission control table 322 to be referred to in the individual transmission control process for request signals. FIG. 9C is a diagram showing a request signal simultaneous transmission control table 324 to be referred to in a simultaneous transmission control process for request signals.

FIG. 10 is a flowchart of the simultaneous transmission control process for request signals which is performed by the CPU 30 of the vehicle-mounted unit 16.

1st Embodiment

The individual transmission control process for request signals will be described below with reference to the flowchart shown in FIG. 8 and the request signal individual transmission control table 322 shown in FIG. 9B.

In step S1, the CPU 30 confirms whether there is an input signal from either one of the door sensors 20a, 20b, 20c or not.

If it is detected that the door sensor 20a on the outer door handle 21 near the driver seat is activated, i.e., if the owner of the portable unit 18 touches the door handle 21 and an on-signal is supplied from the door sensor 20a, then the CPU 30 refers to the request signal individual transmission control table 322 shown in FIG. 9B, and energizes the LF transmitter 54 to transmit an LF request signal from the LF antenna 44 mounted on the door mirror 43 near the driver seat, in step S2. At this time, the radio wave of the request signal is transmitted only in the effective transmission range TA1 (see FIG. 7) of the LF antenna 44 for the request signal.

In step S3, the CPU 30 confirms whether a response signal from the portable unit 18 is received by the RF receiver 42 through the RF antenna 40 or not.

If no response signal is received within a predetermined period of time after the transmission of the LF signal, then the CPU 30 energizes the LF transmitter 56 to transmit an LF request signal from the LF antenna 46 mounted on the corner of the rear bumper 304 near the driver seat in step S4. At this time, the radio wave of the request signal is transmitted only in the effective transmission range TA2 of the LF antenna 46 for the request signal.

In step S5, the CPU 30 confirms whether a response signal from the portable unit 18 is received by the RF receiver 42 through the RF antenna 40 or not.

If no response signal is received within a predetermined period of time after the transmission of the LF signal, then control goes back step S1.

If the request signal sent from the LF antenna 44 or the LF antenna 46 is received by the LF receiver 106 through at least one of the LF antennas 108x, 108y, 108z of the LF antenna 108 of the portable unit 18, and the CPU 100 decides that the received request signal is a normal request signal in step S3 or S5, then the CPU 100 energizes the RF transmitter 102 to send a response signal, which is its own identification signal in response to the request signal, as an RF signal through the RF antenna 104.

If the RF response signal is received by the RF receiver 42 through the RF antenna 40 and the CPU 30 decides that the received response signal is a normal response signal (identification signal), then the CPU 30 controls the door lock unit 90 to operate the door lock actuators 14 to unlock the doors 311, 312 near the driver seat and the doors 313, 314 near the front passenger seat.

It may be determined whether request signals and response signals are normal signals or not by transmitting the vehicle number of the vehicle 12 directly or through function processing, and receiving and confirming the transmitted vehicle number.

If it is detected that the door sensor 20b near the front passenger door is operated in step S1, then the processing in step S2 and the processing in step S4 are modified as follows:

In step S2, the CPU 30 refers to the request signal individual transmission control table 322 shown in FIG. 9B, and energizes the LF transmitter 58 to transmit an LF request signal from the LF antenna 48 mounted on the door mirror 45 near the front passenger seat. At this time, the radio wave of the request signal is transmitted only in the effective transmission range TA3 of the LF antenna 48 for the request signal. In step S4, the CPU 30 energizes the LF transmitter 60 to transmit an LF request signal from the LF antenna 50 mounted on the corner of the rear bumper 304 near the front passenger seat. At this time, the radio wave of the request signal is transmitted only in the effective transmission range TA4 of the LF antenna 50 for the request signal. The other steps remain the same and will not be described in detail below. If a normal RF response signal in response to the request signal transmitted from the LF antenna 48 or the LF antenna 50 is received by the RF receiver 42 through the RF antenna 40 in step S3 or S5, then the CPU 30 controls the door lock unit 90 to operate the door lock actuators 14 to unlock the doors 311, 312 near the driver seat and the doors 313, 314 near the front passenger seat.

If it is detected that the door sensor 20c on the rear hatchback door 315 is operated in step S1, then the processing in step S2 and the processing in step S4 are modified as follows:

In step S2, the CPU 30 refers to the request signal individual transmission control table 322 shown in FIG. 9B, and energizes the LF transmitter 56 to transmit an LF request signal from the LF antenna 46 mounted on the corner of the rear bumper 304 near the driver seat. At this time, the radio wave of the request signal is transmitted only in the effective transmission range TA2 of the LF antenna 46 for the request signal. In step S4, the CPU 30 energizes the LF transmitter 60 to transmit an LF request signal from the LF antenna 50 mounted on the corner of the rear bumper 304 near the front passenger seat. At this time, the radio wave of the request signal is transmitted only in the effective transmission range TA4 of the LF antenna 50 for the request signal. The other steps remain the same and will not be described in detail below. If a normal RF response signal in response to the request signal transmitted from the LF antenna 46 or the LF antenna 50 is received by the RF receiver 42 through the RF antenna 40 in step S3 or S5, then the CPU 30 controls the door lock unit 90 to operate the door lock actuator 14 to unlock the rear hatchback door 315.

2nd Embodiment

The simultaneous transmission control process for request signals will be described below with reference to the flowchart shown in FIG. 10 and the request signal simultaneous transmission control table 324 shown in FIG. 9C.

In step S11, the CPU 30 confirms whether there is an input signal from either one of the door sensors 20a, 20b, 20c or not.

If it is detected that the door sensor 20a on the outer door handle 21 near the driver seat is activated, then the CPU 30 refers to the request signal simultaneous transmission control table 324 shown in FIG. 9C, and simultaneously energizes the LF transmitters 54, 56 to transmit an LF request signal from the LF antenna 44 mounted on the door mirror 43 near the driver seat and an LF request signal from the LF antenna 46 mounted on the corner of the rear bumper 304 near the driver seat in step S12.

When the request signals are simultaneously transmitted, their radio waves overlap each other, and the combined radio wave produces an increased field intensity in the vicinity of a central pillar between the driver seat and the rear seat where the communication ranges overlap each other, providing a substantially triangular new effective transmission range TA12 as shown in FIG. 11A which is not present if the LF request signals are individually transmitted and the intensity of the radio waves is low.

By thus simultaneously transmitting the request signals, the combined effective transmission range for the request signals expands from TA1+TA2 to TA1+TA2+TA12.

In step S13, the CPU 30 confirms whether a response signal from the portable unit 18 is received by the RF receiver 42 through the RF antenna 40 or not.

If no response signal is received within a predetermined period of time after the simultaneous transmission of the LF signal, then control returns to step S1.

If the portable unit 18 is present in the combined effective transmission range TA1+TA2+TA12 for the request signals that are simultaneously transmitted from the LF antennas 44, 46, the request signals are received by the LF receiver 106 through at least one of the LF antennas 108x, 108y, 108z of the LF antenna 108 of the portable unit 18, and the CPU 100 decides that the received request signals are normal request signals, then the CPU 100 energizes the RF transmitter 102 to send a response signal as an RF signal through the RF antenna 104.

If the RF response signal is received by the RF receiver 42 through the RF antenna 40 of the vehicle-mounted unit 16 and the CPU 30 decides that the received response signal is a normal response signal in step S13, then the CPU 30 controls the door lock unit 90 to operate the door lock actuators 14 to unlock the doors 311, 312 near the driver seat and the doors 313, 314 near the front passenger seat in step S14.

If it is detected that the door sensor 20b near the front passenger door is operated in step S11, then the processing in steps S12 through S14 is modified as follows:

In step S12, the CPU 30 refers to the request signal simultaneous transmission control table 324 shown in FIG. 9C, and simultaneously energizes the LF transmitters 58, 60 to transmit an LF request signal from the LF antenna 48 mounted on the door mirror 45 near the front passenger seat and an LF request signal from the LF antenna 50 mounted on the corner of the rear bumper 304 near the front passenger seat.

In this case, a substantially triangular new effective transmission range TA34 as shown in FIG. 11B is provided based on an overlap of radio waves of the request signals. The effective transmission range TA34 is an area where the radio wave of an individually transmitted request signal is too weak to provide an effective transmission range.

By thus simultaneously transmitting the request signals, the combined effective transmission range for the request signals expands from TA3+TA4 to TA3+TA4+TA34.

If the portable unit 18 is present in the combined effective transmission range TA3+TA4+TA34 for the request signals that are simultaneously transmitted from the LF antennas 48, 50, and a response signal in response to the request signals is received from the portable unit 18 in step S13, then the CPU 30 unlocks the doors 311, 312 near the driver seat and the doors 313, 314 near the front passenger seat in step S14.

If it is detected that the door sensor 20c on the rear hatchback door 315 is operated in step S11, then the processing in steps S12 through S14 is modified as follows:

In step S12, the CPU 30 refers to the request signal simultaneous transmission control table 324 shown in FIG. 9C, and simultaneously energizes the LF transmitters 56, 60 to transmit LF request signals respectively from the LF antennas 46, 50 mounted on the corners of the rear bumper 304.

In this case, a substantially triangular new effective transmission range TA24 as shown in FIG. 11C is provided based on an overlap of radio waves of the request signals. The effective transmission range TA24 is an area where the radio wave of an individually transmitted request signal is too weak to provide an effective transmission range.

By thus simultaneously transmitting the request signals, the combined effective transmission range for the request signals expands from TA2+TA4 to TA2+TA4+TA24.

If the portable unit 18 is present in the combined effective transmission range TA2+TA4+TA24 for the request signals that are simultaneously transmitted from the LF antennas 46, 50, and a response signal in response to the request signals is received from the portable unit 18 in step S13, then the CPU 30 unlocks the rear hatchback door 315 in step S14.

In the first and second embodiments described above, the vehicular remote door lock controller is applied to a smart entry system wherein the vehicle 12 starts sending a request signal when the owner of the portable unit 18 touches either one of the door sensors 20a, 20b, 20c, and the doors of the vehicle 12 are unlocked based on the result of a bidirectional authentication process carried out between the portable unit 18 and the vehicle-mounted unit 16. The vehicular remote door lock controller according to the present invention is also applicable to another smart entry system wherein the vehicle 12 is devoid of the door sensors 20a, 20b, 20c, and when the owner of the portable unit 18 approaches the vehicle 12, a bidirectional authentication process is automatically started between the portable unit 18 and the vehicle-mounted unit 16 to unlock the doors of the vehicle 12.

Two embodiments (third and fourth embodiments) of the vehicular remote door lock controller applied to another smart entry system with respect to the simultaneous transmission of request signals will be described below.

3rd Embodiment

Figure 12:
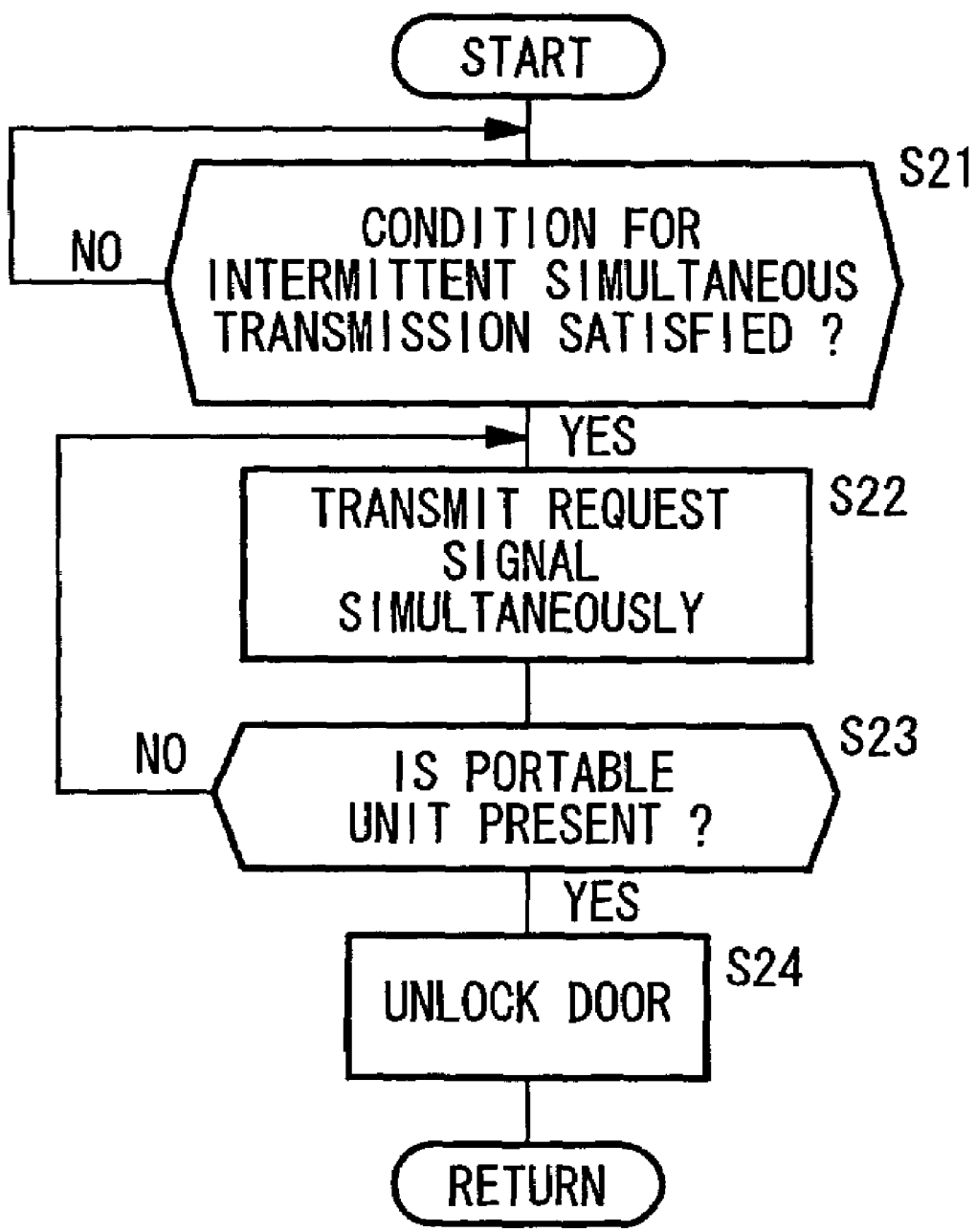
FIG. 12 is a flowchart of an intermittent simultaneous transmission control process for request signals.

An intermittent simultaneous transmission control process for intermittently simultaneously transmitting request signals from two LF antennas (44 and 46, 46 and 50, or 48 and 50) including either one of the LF antennas 46, 50 mounted on the corners of the rear bumper 304 will be described below with reference to a flowchart shown in FIG. 12.

In step S21, the CPU 30 determines whether a condition for intermittently simultaneously transmitting request signals is satisfied or not. Specifically, the condition is satisfied when the CPU 30 confirms that all the door switches 28 are turned off and hence all the doors 311 through 315 are closed. If the condition is satisfied, then the CPU 30 starts an intermittent simultaneous transmission control process for intermittently simultaneously transmitting request signals.

In step S22, LF request signals are simultaneously transmitted from the LF antenna 44 near the driver seat and the LF antenna 46 on the corner of the rear bumper 304 near the driver seat (see FIG. 11A). In step S23, it is determined whether the portable unit 18 is present in the combined effective transmission range TA1+TA2+TA12 or not. If the portable unit 18 is not present in the combined effective transmission range TA1+TA2+TA12, then when a period of 500 [ms], for example, elapses after the simultaneous transmission of the request signals, request signals are simultaneously transmitted from the LF antennas 46, 50 on the corners of the rear bumper 304 (see FIG. 11C). In step S23, it is determined again whether the portable unit 18 is present in the combined effective transmission range TA2+TA4+TA24 or not. If the portable unit 18 is not present in the combined effective transmission range TA2+TA4+TA24, then when a period of 500 [ms] elapses after the simultaneous transmission of the last-mentioned request signals, request signals are simultaneously transmitted from the LF antenna 48 near the front passenger seat and the LF antenna 50 on the corner of the rear bumper 304 near the front passenger seat (see FIG. 11B). In step S23, it is determined again whether the portable unit 18 is present in the combined effective transmission range TA3+TA4+TA34 or not. Subsequently, the state of simultaneous transmission of request signals shown in FIG. 11A, the state of simultaneous transmission of request signals shown in FIG. 11C, and the state of simultaneous transmission of request signals shown in FIG. 11B are successively repeated in the order named upon elapse of successive periods of 500 [ms].

If the portable unit 18 is present in the corresponding effective transmission range in either one of the above states of simultaneous transmission and a normal response signal is sent from the portable unit 18 to the vehicle-mounted unit 16 in step S23, then the doors which provide the effective transmission range where the portable unit 18 is present are unlocked in step S24.

Specifically, if the portable unit 18 is present in the effective transmission range TA1+TA2+TA12 shown in FIG. 11A, then the doors 311, 312 near the driver seat are unlocked. If the portable unit 18 is present in the effective transmission range TA2+TA4+TA24 shown in FIG. 11C, then the rear hatchback door 315 is unlocked. If the portable unit 18 is present in the effective transmission range TA3+TA4+TA34 shown in FIG. 11B, then the doors 313, 314 near the front passenger seat are unlocked. According to the above intermittent simultaneous transmission control process, the vehicle 12 is not required to have the door sensors 20a, 20b, 20c.

4th Embodiment

An intermittent simultaneous transmission control process for intermittently simultaneously transmitting request signals from all the LF antennas 44, 46, 50, 48 will be described below with reference to the flowchart shown in FIG. 12.

In step S21, the CPU 30 determines whether a condition for intermittently simultaneously transmitting request signals is satisfied or not. Specifically, as described above, the condition is satisfied when the CPU 30 confirms that all the door switches 28 are turned off and hence all the doors 311 through 315 are closed. If the condition is satisfied, then the CPU 30 starts an intermittent simultaneous transmission control process for intermittently simultaneously transmitting request signals.

In step S22, request signals are simultaneously transmitted from all the LF antennas 44, 46, 50, 48.

At this time, a combined effective transmission range TAall (TA1+TA2+TA3+TA4+TA12+TA24+TA34) is provided, as shown in FIG. 13.

In step S23, it is determined whether the portable unit 18 is present in the combined effective transmission range TAall or not. If the portable unit 18 is not present in the combined effective transmission range TAall, then when a period of 500 [ms] elapses after the simultaneous transmission of the request signals, request signals are simultaneously transmitted again from all the LF antennas 44, 46, 50, 48 in step S22.

If the portable unit 18 is present in the combined effective transmission range TAall and a normal response signal is sent from the portable unit 18 to the vehicle-mounted unit 16 in step S23, then all the doors 311 through 315 are unlocked in step S24. According to the above intermittent simultaneous transmission control process, the door sensors 20a, 20b, 20c can also be dispensed with.

The first through fourth embodiments of the present invention have been described in detail above. However, the vehicle 12 may not have four LF antennas. If the door 313 near the front passenger seat does not need to be unlocked by the portable unit 18, then the vehicle 12 may have a minimum of three LF antennas including the LF antenna 44 mounted on the door mirror 43 near the driver seat and the LF antennas 46, 50 mounted on the respective corners of the rear bumper 304, exclusive of the LF antenna 48 mounted on the door mirror 45 near the front passenger seat.

The LF antennas 44, 48 mounted on the side surfaces of the vehicle 12 should preferably be located on protruding positions on the outer surface of the vehicle 12, such as on the door mirrors 43, 45 as described above, in order to widen the communication range with reduced transmission electric power. The LF antennas 44, 48 may be disposed on fender mirrors. Alternatively, the LF antennas 44, 48 may be disposed on the respective corners of the front bumper, i.e., the respective corners of the front end of the vehicle 12, rather than being disposed on the door mirrors 43, 45.

The LF antennas 46, 50 on the rear corners of the vehicle 12 should preferably be disposed in respective positions that are as remote as possible in the outward direction of the vehicle 12 from the outer panel (steel panel) of the vehicle 12, such as the rear panel 300 serving as a radio wave shield member, as described above with reference to FIGS. 5 and 6. In FIGS. 5 and 6, since the LF antennas 46, 50 are floating, i.e., spaced, from the rear panel 300 by the raised mount plates 302, the LF antennas 46, 50 are disposed in respective positions spaced from the radio wave shield member, i.e., the outer panel, of the vehicle 12.

Since the LF antennas 46, 50 are disposed in respective positions that are as remote as possible in the outward direction of the vehicle 12 from the outer panel thereof, radio waves radiated from the LF antennas 46, 50 are liable to reach farther areas on the side surfaces of the vehicle 12 and a farther area on the rear surface of the vehicle 12, from the corners of the vehicle 12 where the LF antennas 46, 50 are located. Therefore, the intensity of radiated radio waves may be reduced, i.e., the transmission electric power may be reduced, in order to provide desired effective transmission ranges. The LF antennas 46, 50 may be reduced in size and the power consumption by the battery 86 may be reduced, accordingly.

In the above embodiments, the LF antennas 108x, 108y, 108z of the portable unit 18 have respective axes extending parallel to the respective three orthogonal axes. Therefore, the portable unit 18 is substantially omnidirectional, and can receive request signals reliably even if it is located in any spatial positions with respect to the vehicle-mounted unit 16. Thus, each of the LF antennas 44, 46, 48, 50 is not required to have two LF antennas to produce a rotating magnetic field, as with conventional vehicular remote door lock controllers.

According to the present invention, of at least the three LF antennas, at least one LF antenna 46 is mounted on a corner of the vehicle 12, and the remaining LF antennas 44, 50 are disposed such that their effective transmission ranges TA1, TA4 overlap the effective transmission range TA2 of the LF antenna 46 mounted on the corner of the vehicle 12, and do not overlap each other outside of the vehicle 12.

Inasmuch as at least one LF antenna 46 is mounted on a corner of the vehicle 12, the radio wave radiated from the LF antenna 46 is propagated to the both surfaces of the vehicle 12 on the opposite sides of the corner, i.e., the side surface near the driver seat and the rear surface near the rear hatchback door, providing the effective transmission range (communication range) TA2. Because the remaining LF antennas 44, 50 are disposed such that their effective transmission ranges TA1, TA4 overlap the effective transmission range TA2 of the LF antenna 46 mounted on the corner of the vehicle 12, the vehicle-mounted unit 16 with the three LF antennas can reliably communicate with the portable unit 18 that is positioned near both the side surfaces of the vehicle 12, i.e., the side surface near the driver seat and the rear surface near the rear hatchback door.

The LF antennas 44, 46 disposed on the corners or the LF antennas 46, 50 or the LF antennas 44, 46, 50 may simultaneously be energized to provide constriction-free communication ranges on the two side surfaces of the vehicle 12 on the opposite sides of the corner where the LF antenna 46 is disposed (see FIGS. 11A through 11C), unlike the conventional communication ranges shown in FIG. 15B.

According to the first embodiment described above, of the four antennas 44, 46, 48, 50 mounted on the vehicle 12 for performing radio communications with the portable unit 18 that is present around the vehicle 12, the two antennas 46, 50 whose communication ranges overlap each other are disposed on the respective corners of the rear bumper 304, and the other antennas 44, 48 are mounted on the respective side surfaces of the vehicle 12 such that their communication ranges overlap the communication ranges of the closer ones (46 for 44, 50 for 48) of the two antennas 46, 50 on the corners of the rear bumper 304. Therefore, the number of LF antennas covering the communication ranges on the side surfaces of the vehicle 12 and the rear surface of the vehicle 12 is reduced from 5 (conventional vehicular remote door lock controller) to 4. As a result, the doors of the vehicle 12 can be locked and unlocked using a reduced number of LF antennas, and hence the costs of materials used to manufacture the vehicular remote door lock controller, the number of man-hours required to manufacture the vehicular remote door lock controller, and the manufacturing cost of the vehicular remote door lock controller can be reduced.

Figure 16:
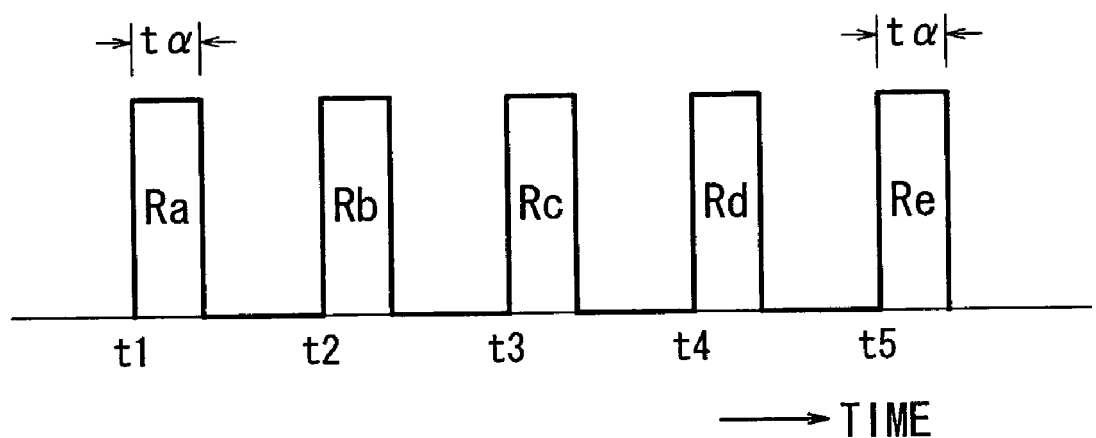
FIG. 16 is a diagram showing a total communication time of a conventional vehicular remote door lock controller.

The conventional vehicular remote door lock controller requires a total communication time of (t1 through t5+tα) as shown in a timing chart (a) (which is identical to FIG. 16) of FIG. 14. With the individual transmission control process according to the first embodiment, since the presence of the portable unit 18 near the three surfaces of the vehicle 12, except the front surface thereof, can be confirmed by transmitting a request signal Ri four times, the total communication time is reduced to (t1 through t4+tα) as shown in a timing chart (b) of FIG. 14.

With the simultaneous transmission control process for simultaneously transmitting request signals from two LF antennas according to the second and third embodiments, since the presence of the portable unit 18 near the three surfaces of the vehicle 12, except the front surface thereof, can be confirmed by transmitting a request signal Ri three times, the total communication time is reduced to (t1 through t3+tα) as shown in a timing chart (c) of FIG. 14.

With the simultaneous transmission control process for simultaneously transmitting request signals from the four LF antennas 44, 46, 48, 50 according to the fourth embodiment, since the presence of the portable unit 18 near the three surfaces of the vehicle 12, except the front surface thereof, can be confirmed by transmitting a request signal Ri once, the total communication time is reduced to tα as shown in a timing chart (d) of FIG. 14.

Although certain preferred embodiments of the present invention have been shown and described in detail, it should be understood that various changes and modifications may be made therein without departing from the scope of the appended claims.

What is claimed is:

1. A vehicular remote door lock controller comprising:
   a portable unit;
   a control unit mounted on a vehicle for performing radio communications with said portable unit through radio waves, and locking and unlocking doors of said vehicle depending on results of said radio communications; and
   at least three antennas mounted on said vehicle for performing radio communications with said portable unit which is present around the vehicle;
   at least one of said three antennas being mounted on a corner of said vehicle and the remaining antennas being disposed such that communication ranges thereof overlap a communication range of the antenna mounted on the corner of said vehicle,
   wherein said remaining antennas are disposed respectively on surfaces of said vehicle on both sides of said corner of the vehicle on which said at least one antenna is mounted.

2. A vehicular remote door lock controller according to claim 1, wherein said at least one antenna mounted on the corner of said vehicle is mounted on a corner of a rear bumper of said vehicle.

3. A vehicular remote door lock controller according to claim 1, wherein the antenna mounted on said corner and at least one of the remaining antennas simultaneously transmit request signal.

4. A vehicular remote door lock controller according to claim 1, wherein the antenna mounted on said corner and at least one of the remaining antennas simultaneously transmit request signal.

5. A vehicular remote door lock controller comprising:
   a portable unit;
   a control unit mounted on a vehicle for performing radio communications with said portable unit through radio waves, and locking and unlocking doors of said vehicle depending on results of said radio communications; and
   four antennas mounted on said vehicle for performing radio communications with said portable unit which is present around the vehicle;
   two of said four antennas, whose communication ranges overlap each other, being mounted on respective corners of said vehicle and the remaining antennas being disposed on respective opposite side surfaces of the vehicle such that communication ranges thereof overlap a communication range of a closer one of the two antennas mounted on the corners of said vehicle.

6. A vehicular remote door lock controller according to claim 5, wherein the two antennas whose communication ranges overlap each other, mounted on the respective corners of said vehicle are mounted on respective corners of a rear bummper of said vehicle.

7. A vehicular remote door lock controller according to claim 5, wherein each of the two antennas mounted on the respetive corners of said vehicle and at least a closer one of the other antennas simultaneously transmit request signals.

* * * * *